(12) United States Patent
Nam et al.

(10) Patent No.: US 10,139,169 B2
(45) Date of Patent: Nov. 27, 2018

(54) ADSORPTION SYSTEM

(71) Applicant: Massachusetts Institute of Technology, Cambridge, MA (US)

(72) Inventors: Young Suk Nam, Yongin (KR); Ryan Enright, Whitestone, NY (US); Shalabh Maroo, Syracuse, NY (US); Evelyn N. Wang, Cambridge, MA (US); Shankar Narayanan, Allston, MA (US); Ian Salmon McKay, Seattle, WA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 150 days.

(21) Appl. No.: 13/657,302

(22) Filed: Oct. 22, 2012

(65) Prior Publication Data

US 2013/0192281 A1    Aug. 1, 2013

Related U.S. Application Data

(60) Provisional application No. 61/549,973, filed on Oct. 21, 2011.

(51) Int. Cl.
| | |
|---|---|
| *F28D 17/00* | (2006.01) |
| *B60H 1/32* | (2006.01) |
| *B01J 20/22* | (2006.01) |
| *B01J 20/28* | (2006.01) |
| *B01J 20/20* | (2006.01) |
| *F25B 17/08* | (2006.01) |

(52) U.S. Cl.
CPC ............ *F28D 17/00* (2013.01); *B01J 20/205* (2013.01); *B01J 20/226* (2013.01);
(Continued)

(58) Field of Classification Search
CPC . F28D 17/00; B01J 20/2804; B01J 20/28052; F25B 17/083; F25B 17/00; B60H 1/3201
(Continued)

(56) References Cited

U.S. PATENT DOCUMENTS

| | | | | |
|---|---|---|---|---|
| 2,434,419 A | * | 1/1948 | Laughlin | ................ B01D 53/26 96/126 |
| 4,002,201 A | * | 1/1977 | Donaldson | ............ F28D 1/0333 165/166 |

(Continued)

FOREIGN PATENT DOCUMENTS

| | | |
|---|---|---|
| DE | 44 13 032 | 4/1995 |
| DE | 195 39 102 | 4/1997 |

(Continued)

OTHER PUBLICATIONS

Machine Translation of Description of JP2007218504; retreived on Oct. 2016.*
(Continued)

*Primary Examiner* — Orlando E Aviles Bosques
(74) *Attorney, Agent, or Firm* — Steptoe & Johnson LLP

(57) ABSTRACT

An adsorption system can be used as part of a climate control system in a vehicle or in any other space requiring heating or cooling. An adsorbent bed can include a plurality of plates, a layer including an adsorbent material adjacent to a portion of at least one plate; and a plurality of passages between the plates.

12 Claims, 16 Drawing Sheets

(52) U.S. Cl.
CPC ..... *B01J 20/2804* (2013.01); *B01J 20/28052* (2013.01); *B60H 1/3201* (2013.01); *F25B 17/08* (2013.01); *B01J 2220/56* (2013.01)

(58) Field of Classification Search
USPC .................................................. 62/476, 477
See application file for complete search history.

(56) References Cited

U.S. PATENT DOCUMENTS

| | | | | |
|---|---|---|---|---|
| 4,815,534 | A | * | 3/1989 | Fuerschbach ......... F28D 9/0075 165/166 |
| 2009/0126371 | A1 | * | 5/2009 | Powell et al. ............... 62/324.1 |

FOREIGN PATENT DOCUMENTS

| | | | |
|---|---|---|---|
| DE | 195 45 450 | | 7/1997 |
| DE | 199 27 879 | | 1/2001 |
| JP | 2007-218504 A | * | 8/2007 |
| WO | WO 2008/029185 | | 3/2008 |

OTHER PUBLICATIONS

International Preliminary Report on Patentability dated May 1, 2014, International Application No. PCT/US2012/061311.
International Search Report, dated Feb. 4, 2013, International Application No. PCT/US2012/061311.

* cited by examiner

ADSORPTION SYSTEM

CLAIM OF PRIORITY

This application claims priority to provisional U.S. Patent Application No. 61/549,973, filed Oct. 21, 2011, which is incorporated by reference in its entirety.

FEDERALLY SPONSORED RESEARCH OR DEVELOPMENT

This invention was made with government support under Grant No. DE-AR0000185 awarded by the Department of Energy. The government has certain rights in this invention.

TECHNICAL FIELD

The invention relates to an adsorption system that can be used as part of a climate control system in a vehicle.

BACKGROUND

Many electric vehicles incorporate climate control systems originally developed for traditional vehicles. These climate control systems often rely on a vapor compression cycle, which necessitates a compressor. In a traditional vehicle, the compressor is driven by a pulley attached to an internal combustion engine. But in an electric vehicle, there is no engine, so the compressor must be driven by an electric motor powered by a battery. The power consumption of this electric motor can be significant. In fact, operating the climate control system can produce a noticeable decrease in the range of the electric vehicle. Despite recent advances in sustained power delivery, weight, and overall capacity of electric batteries, their energy storage densities remain much lower than gasoline and other liquid fuels. Consequently, relying on the battery to power the vehicle's climate control system is not a practical solution when developing an electric vehicle with enhanced range.

SUMMARY

In one example, an adsorbent bed can include a plurality of plates, a layer including an adsorbent material adjacent to a portion of at least one plate, and a plurality of passages between the plates. The plates can be arranged in a stack and hermetically sealed. The adsorbent material can include a zeolite, biporous zeolite, or metal oxide framework. The adsorbent material can include 13X, MCM-41, MFI, VPI-5, MOF-199, Mg-MOF-74, ZIF, MOF-5, MOF-177, MOF-210, graphite flakes, carbon nanotubes, or a combination thereof. The absorbent material can be configured to adsorb and desorb a fluid comprising water. The layer can have a thickness in the range of about 0.1-20 mm. The layer can have a thickness in the range of about 1-5 mm. The first plate can have a raised perimeter extending in a first direction perpendicular to a top surface of the first plate. The first plate can have a plurality of holes arranged along the top surface and a raised portion surrounding each hole and extending from the plate in a second direction opposite the first direction. The raised perimeter and the top surface of the first plate can define a volume for receiving the layer. A second plate similar to the first plate can be included in the bed, and each raised portion surrounding each hole in the first plate is joined to each raised portion surrounding each hole in the second plate. The raised portions surrounding each hole in the first and second plates can be joined by a spot welded joint or a brazed joint. A raised perimeter of the second plate can be joined to a raised perimeter of a third plate. The raised perimeters of the second and third plates can be joined by a seam weld to provide a hermetic seal.

The plurality of plates can form a plurality of internal fins confined within a housing. The housing can provide thermal communication between the internal fins and a plurality of external fins.

In another example, a climate control system can include an output of a first adsorbent bed fluidly connected to an input of a condenser, an output of the condenser fluidly connected to an input of a first reservoir, an output of the first reservoir fluidly connected to a first expansion valve, the first expansion valve fluidly connected to an input of an evaporator, and an output of the evaporator fluidly connected to an input of the first adsorbent bed. The system can also include an output of a second adsorbent bed fluidly connected to the input of the condenser, the output of the condenser fluidly connected to an input of a second reservoir, an output of the second reservoir fluidly connected to a second expansion valve, the second expansion valve fluidly connected to the input of the evaporator; and the output of the evaporator fluidly connected to an input of the second adsorbent bed.

In yet another example, the first adsorbent bed can be configured to become operational upon opening the first thermal expansion valve, thereby allowing a fluid to pass through the evaporator before entering the first adsorbent bed. The system can be configured to allow to the fluid to pass from the first adsorbent bed through the condenser and the first reservoir before returning to the first expansion valve. The second adsorbent bed can be configured to become operational upon opening the second thermal expansion valve, thereby allowing the fluid to pass through the evaporator before entering the second adsorbent bed. The system can be configured to allow fluid to pass from the second adsorbent bed through the condenser and the second reservoir before returning to the second expansion valve. In this example, the first adsorbent bed can include a plurality of plates, a layer including an adsorbent material adjacent to a portion of at least one plate, and a plurality of passages between the plates. The plates can be arranged in a stack and hermetically sealed. The adsorbent material can include a zeolite, biporous zeolite, or metal oxide framework. The adsorbent material can include 13X, MCM-41, MFI, VPI-5, MOF-199, Mg-MOF-74, MOF-5, MOF-177, MOF-210, graphite flakes, carbon nanotubes, or a combination thereof. The fluid can include water. The fluid can also contain ammonia.

In one example, a method for cooling a vehicle can include releasing a fluid from a reservoir through a thermal expansion valve, passing the fluid from the thermal expansion valve through an evaporator and into an adsorbent bed, thereby causing the temperature of the evaporator to decrease, and passing air over the evaporator and into a vehicle cabin to cool the vehicle cabin. The method can further include cooling the adsorbent bed to maintain the adsorbent bed at an allowable operating temperature. The adsorbent bed can include an adsorbent material comprising 13X, MCM-41, MFI, VPI-5, MOF-199, Mg-MOF-74, MOF-5, MOF-177, MOF-210, graphite flakes, carbon nanotubes, or a combination thereof.

In another example, a method for heating a vehicle can include releasing a fluid from a reservoir through a thermal expansion valve, passing the fluid from the thermal expansion valve through an evaporator and into an adsorbent bed, thereby causing the temperature of the adsorbent bed to increase, and transferring heat from the adsorbent bed into a vehicle cabin to heat the vehicle cabin. The method can further include maintaining the temperature of the evaporator above the freezing point of the fluid. The temperature of the evaporator can be maintained above a freezing point of the fluid by providing heat to the evaporator from a heat source comprising ambient air, waste heat, an auxiliary heater, or any combination thereof.

In still another example, a method for controlling vehicle climate can include operating a first climate control system having a first adsorbent bed until a first reservoir of fluid is depleted, deactivating the first climate control system when the first reservoir of fluid is depleted and activating a second climate control system comprising a second adsorbent bed, and replenishing the first reservoir with fluid while the second climate control system is activated. The method can further include operating the second climate control system until a second reservoir of fluid is depleted, deactivating the second climate control system when the second reservoir of fluid is depleted, reactivating the first climate control system, and replenishing the second reservoir with fluid while the first climate control system is operating. The first climate control system can include a plurality of plates, a layer including an adsorbent material adjacent to a portion of at least one plate, and a plurality of passages between the plates. The plates can be arranged in a stack and hermetically sealed. The adsorbent material can include a zeolite, biporous zeolite, or metal oxide framework. The adsorbent material can include 13X, MCM-41, MFI, VPI-5, MOF-199, Mg-MOF-74, MOF-5, MOF-177, MOF-210, graphite flakes, carbon nanotubes, or a combination thereof.

DETAILED DESCRIPTION

Figure 1:
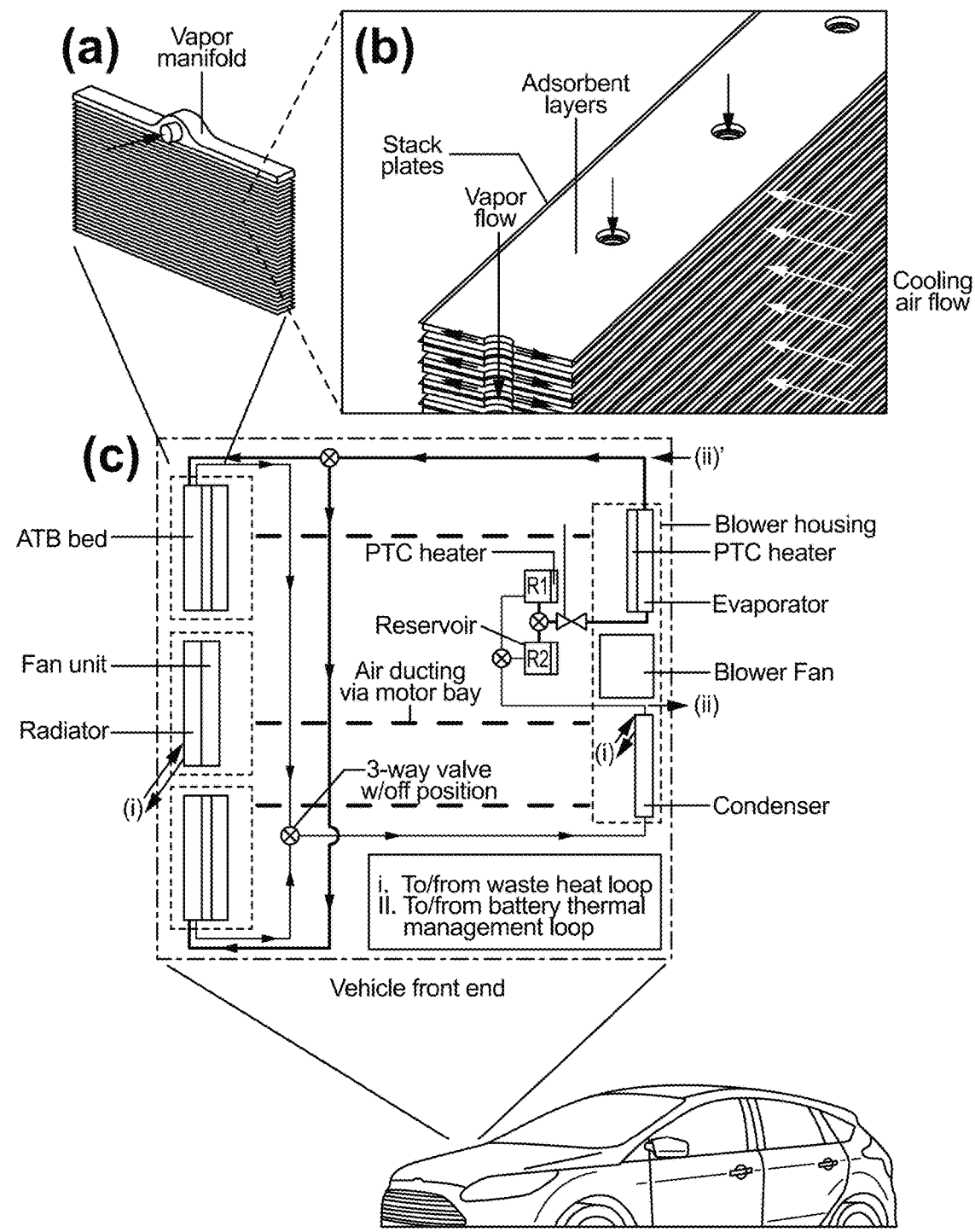
FIGS. 1A-1C are schematics of an exemplary thermal adsorption system.

Climate control systems in electric vehicles (EVs) can be inefficient and can place a significant demand on the vehicle's battery. Resistive heaters are commonly used for heating, and these heaters have a coefficient of performance (COP) that can never exceed unity. For cooling, vapor compression cycles are commonly used and rely on electrically-driven compressors. These systems have COPs between 1.6 and 2.2. The high energy demands of these systems result in rapid depletion of the vehicle's battery. As a result, driving range of the EV can be reduced by 30% or more.

In view of the foregoing, it is desirable to have an effective and efficient thermal system for climate control of an electric vehicle (EV). Desirable attributes for the thermal system include, for example, a high cooling rate, high heating storage capacity, fast charging time, and negligible self-discharge. It can also be desirable to have a system that is compact and lightweight, thereby promoting overall efficiency of the EV. To these ends, the thermal system can incorporate an adsorptive cycle, which uses substantially less battery power than existing systems and, consequently, increases driving range of the EV.

The system described herein can store thermal energy while the vehicle is not in operation, such as during charging of the vehicle's electrical battery. Due to the large thermal capacity of the system, it can provide climate control of a vehicle cabin over an extended period of time that matches the typical drive period of an EV vehicle with minimal electrical power input from the on-board electrical battery. As a result, the operational COP can far exceed conventional systems. In one example, the system can have an operational COP of about 16.7 for a scenario of steady state operation with a heating or cooling rate of 2.5 kW and an electrical input to run the blower fan of about 150 W. This COP far exceeds COPs of existing climate control systems.

In one example, the thermal system can include an adsorbent material. The adsorbent material can include a high-adsorption nanostructured material, which can have high adsorption capacities at low relative pressures. The adsorbent material can have a 20-80 wt % of water adsorption, or higher, at relative pressure of 0.1-0.8, e.g., <0.2, and can have sorption rates ranging from 0.2-0.8 $kg_w/kg_a hr$, or greater. The adsorbent material can adsorb a heat transfer fluid, such as, for example, water. The adsorbent material can be deposited as a layer on one or more plates, e.g., metal plates. The metal plates can be arranged in a stack and joined by welding or brazing to form an adsorbent bed that can be hermetically sealed. The adsorbent bed can significantly enhance heat transfer between the bed and a cross flow by including a plurality of cross-flow channels between the plates. The thermal resistance of each layer can be influenced by adjusting the thickness of the layer; a thinner layer can provide lower thermal resistance. As a result, this system provides a low-cost and scalable design for cooling and heating an electric vehicle on demand. The metal plates can include any suitable metal, such as aluminum, having a relatively high thermal conductivity. Other suitable materials for the plates can include copper, alloys, or even non-metals having sufficient thermal conductivity.

An example of a thermal adsorptive system is shown in FIG. 1. FIG. 1a shows a vapor manifold into which vapor flows. FIG. 1b is a shows a cutaway of the manifold, illustrating a stack of plates having layers including an adsorbent material. The plates in FIG. 1b are shown with a series of holes, which are aligned to provide vapor flow channels within the stack. A heat transfer fluid can flow in the vapor channels and thereby come in contact with the layers including the adsorbent material. Because the stack is hermetically sealed, cooling air can flow between the plates without contacting or mixing with the heat transfer fluid, and the heat transfer fluid is contained within the stack.

As shown in FIG. 1c, the thermal system can include a two-bed design that increases operating time of the system. The system includes two independent systems, where the first system includes a first bed and the second system includes a second bed. The first bed can be used while the second bed is being charged and vice versa. As a result of the two-bed configuration, the system can provide continuous functionality, even when one of the reservoirs has been depleted of fluid. In a passenger vehicle application, the first and second systems can each have a capacity of, for example, about 1.25 kWh each, so if one reservoir becomes discharged after providing cooling or heating, the other bed can immediately become operational.

In the example described above, the overall system may have a COP of 0.55-0.7. Although the overall COP of the cycle for heating and cooling is low, the COP is very high while the EV is in operation, because the only energy input to the system is through fans or blowers. Assuming that fans or blowers consume about 0.15-0.3 kW of battery power in 1 hour, the cooling COP is about 8-17 based on a cooling capacity of 2.5 kWh. The same analysis can be applied during heating, where an ambient temperature above 0° C. leads to a maximum heating COP of about 17.

Figure 8A:
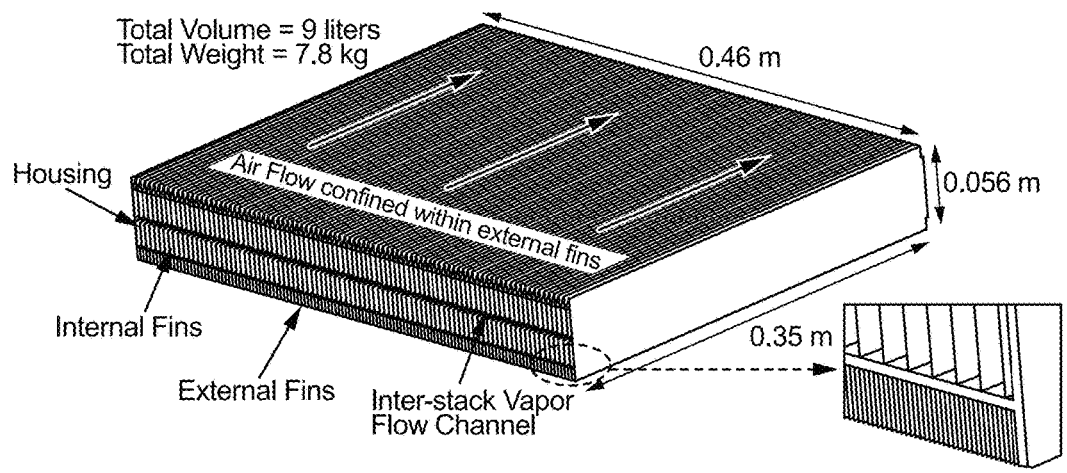
FIGS. 8A-8B are schematic diagrams of representative designs of adsorption beds that isolate vapor and adsorbent from the ambient air. Heat generated during adsorption is transferred via (FIG. 8A) extended surfaces and forced air convection, and (FIG. 8B) internal flow using a liquid combined with an intermediate heat exchanger (not shown). The dimensions shown in FIGS. 8A-8B are exemplary only, and are not in any way limiting.
Figure 8B:
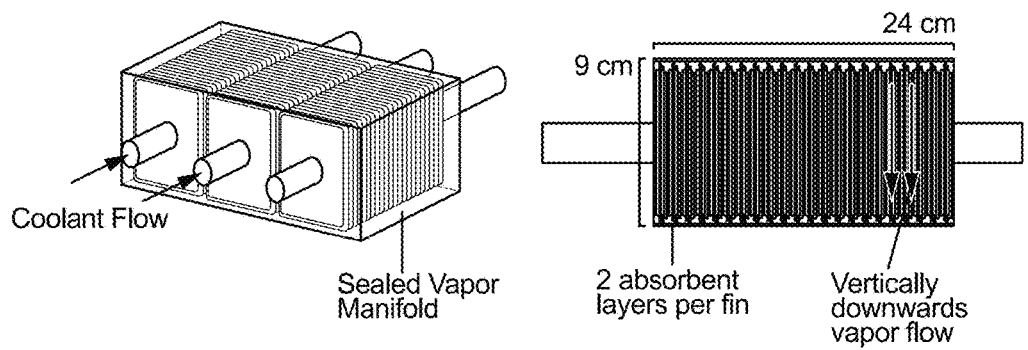

Alternative designs for the absorption bed are shown in FIGS. 8A and 8B. The designs in FIGS. 8A and 8B can provide good reliability in maintaining a hermetic seal. Additionally since both sides of the metal substrates can hold adsorbents, a larger mass of adsorbent can be packed in the bed. The dimensions shown in FIGS. 8A-8B are exemplary only, and are not in any way limiting.

FIG. 8A represents an adsorption bed to transfer heat directly from the source to the cabin air by using extended surfaces (labeled "fins" in FIGS. 8A-8B). The design allows fabrication of the bed using conventional machining (e.g., milling) of a single metal block, which can reduce or eliminate the interfacial thermal resistance introduced by soldered or welded joints. The vapor flow passes over the internal fins, while external air is in contact with the external fins. The internal and external fins are designed to promote diffusion of the vapor phase within the bed and the heat transfer from the bed to the cabin air.

FIG. 8B shows a design based on internal flow of a liquid coolant. A liquid cooling based bed design can be easily manufactured using pre-built, finned-tube structures and a monolithic sealed vapor manifold. The liquid-cooled approach also offers the flexibility in the bed's external geometry, a distinct advantage for integration with crowded vehicle engine compartment and the additional option to provide battery thermal management. The advantages of the liquid-cooled bed should be balanced against the extra weight and power required to circulate coolant, as well as the effects of a separate liquid-air heat exchanger (heater core).

As shown in FIG. 1c, the first and second beds can be part of two parallel systems. In the first system, an output of the first adsorbent bed (ATB bed) can be fluidly connected to an input of a condenser, and the output of the condenser can be fluidly connected to an input of a first reservoir (R1). An output of the first reservoir can be connected to a first thermal expansion valve (TXV) that is fluidly connected to an input of an evaporator. The output of the evaporator can be fluidly connected to an input of the first adsorbent bed. In addition, the first system can include a first valve between the first adsorbent bed and the condenser, a third valve between the condenser and the first reservoir, and/or a sixth valve between the evaporator and the first adsorbent bed (see FIGS. 2 and 3).

Figure 2:
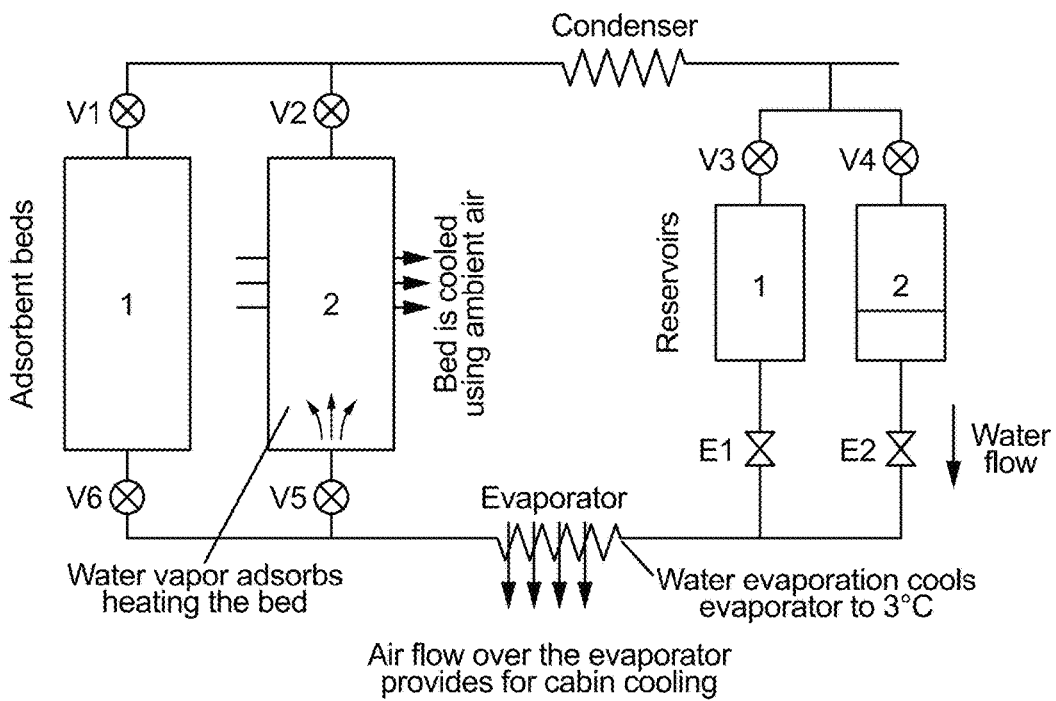
FIG. 2 is a schematic of an adsorption cycle operating in a cooling mode.

As shown in FIG. 1c and FIG. 2, and similar to the first system, the second system can include an output of a second adsorbent bed fluidly connected to the input of the condenser, and the output of the condenser can be fluidly connected to an input of the second reservoir (R2). An output of the second reservoir can be connected to a second thermal expansion valve that is fluidly connected to the input of the evaporator. The output of the evaporator can be fluidly connected to an input of the second adsorbent bed. In addition, the second system can include a second valve between the second adsorbent bed and the condenser, a fourth valve between the condenser and the second reservoir, and/or a fifth valve between the evaporator and the second adsorbent bed.

During a cooling mode, illustrated in FIG. 2, the first expansion valve can open to allow the heat transfer fluid to pass from the first reservoir to the evaporator en route to the first adsorbent bed. In FIG. 2, the heat transfer fluid is depicted as water; other suitable heat transfer fluids may be used. Evaporation of the fluid in the evaporator can cause the temperature of the evaporator to decrease. In one example, the temperature of the evaporator may decrease to a temperature slightly above the freezing point of the fluid; e.g., about 3° C. for water. Ambient air, or air from the vehicle cabin, can be directed over the evaporator to chill the air, which can then be delivered to the vehicle cabin to provide cooling to the vehicle interior. The vaporized fluid passes from the evaporator into the first bed. As the fluid vapor is adsorbed within the first bed, the temperature of the bed can increase. To maintain the first bed at an allowable operating temperature, and thereby avoid performance degradation, it may be desirable to provide cooling to the first bed. Any suitable method of cooling can be employed, such as air cooling or liquid cooling. For a vehicle that is being driven at suitable speeds, ambient air can be deflected into the front vehicle bay to provide cooling of the adsorbent bed. The second system can operate similarly to the first system while in a cooling mode.

During the cooling mode, a coolant can be chilled by circulating in contact with the evaporator. From there, the coolant can be circulated through a cooling jacket of the electrical battery. In one example, the electrical battery can be a lithium-ion battery that has a temperature-dependent performance. Accordingly, cooling the battery can improve performance and longevity of the battery and thereby improve vehicle range. In this way, the system can provide temperature control to vehicle systems (e.g., the vehicle battery) other than climate control for the vehicle interior.

Figure 3:
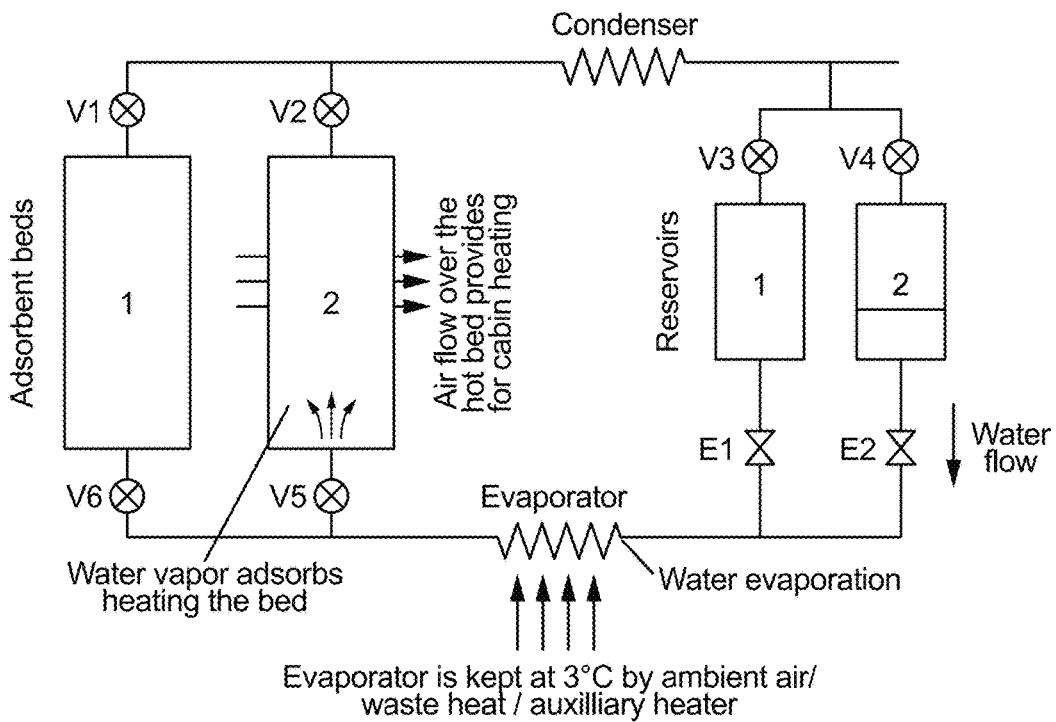
FIG. 3 is a schematic of an adsorption cycle operating in a heating mode.

During a heating mode, illustrated in FIG. 3, the first expansion valve can open to allow fluid to pass from the first reservoir to the evaporator en route to the first adsorbent bed. In FIG. 3, the heat transfer fluid is depicted as water; other suitable heat transfer fluids may be used. As the fluid vapor is adsorbed within the adsorbent material in the first bed, thermal energy is given off, the temperature of the bed can increase. In one example, air is passed over the first bed to heat the air, which can then be delivered to the vehicle cabin to heat vehicle interior. Alternately, any other heat transfer method can be employed. Evaporation of the fluid in the evaporator can cause the temperature of the evaporator to decrease. To maintain the temperature of the evaporator above a freezing point of the fluid, it may be necessary to heat the evaporator. In one example, this can include passing ambient air over an external surface of the evaporator. Alternately, any other suitable method of heating the evaporator can be used, such as providing waste heat from the vehicle's battery, or electric motor, or from an auxiliary heater. The second system can operate similarly to the first system while in a heating mode.

During the heating mode, waste heat from the radiator can be routed to the evaporator via air flow through the motor bay. This energy can be transferred to the adsorbent beds where the heat is upgraded during the adsorption process, simultaneously increasing temperature and releasing further heat, and can be routed back to the blower unit via air flow through the motor bay. The heat can then be used to provide cabin heating. By incorporating a PTC heater with the evaporator, frosting of the evaporator can be avoided.

Charging of the system occurs when fluid is returned from the adsorbent bed to the reservoir. The system can be charged during a charging session, such as an overnight charging session. In one example, the system can be charged using resistive heaters. When the EV is plugged into a wall plug-in, one or more resistive heaters can be activated while the vehicle's electrical battery is being charged. The resistive heaters can encourage desorption of fluid from the adsorbent material in the adsorbent bed. In one example, the heaters can be located between each adsorbent bed and its respective fan unit, as shown in FIG. 1c. The adsorbent material desorbs the heat transfer fluid at a rate that is dependent on bed temperature and heating rate. In one example, using water as the heat transfer fluid, for a maximum bed temperature of 150° C. and a heating rate of about 0.5-1° C./min, the charging time can be about 1-4 hours.

Upon exiting the adsorbent bed, the fluid vapor migrates to the condenser where it returns to a liquid phase before being collected in the reservoir, as shown in FIGS. 2 and 3. Heat generated in the condenser during charging can be managed via a pumped liquid connection to the radiator, as shown in FIG. 1. At the end of the charging process, the first and second reservoirs will be charged with fluid, and valves in the system can be closed to retain the fluid in the reservoirs. By ensuring the reservoirs are full of fluid before departing from the charging station, the usage of onboard electrical battery power can be significantly reduced, especially in the case of short trips where recharging a reservoir may not be required.

The operating fluid in the system can be a single component or a mixture of two or more components. In one example, pure water can be used as the fluid, since it has a high latent heat of evaporation and negligible cost. In another example, a component such as ammonia can be added to the water. The solution can contain approximately 1% ammonia by weight. One benefit of ammonia is that it reduces the freezing point of pure water, thereby making freezing less likely and extending functionality of the system. However, if the fluid freezes within the system, the vehicle's electrical battery can power a heater to melt the solidified fluid. By heating the components of the system, the fluid can be returned to a suitable operating temperature. Alternately, to prevent freezing from occurring in the first place, and thereby preventing resultant delays in climate control functionality, a control system can employed. The control system can monitor the temperature of the fluid within each component of the system and provide sufficient heat to the component to maintain each component's temperature above the freezing point of the fluid. In one example, the control system can include a microprocessor, thermocouples or other suitable temperature measurement devices, and one or more heating devices capable of maintaining the temperature of the components above the freezing point of the fluid. In another example, a pump can be used to circulate fluid within the reservoir to further inhibit freezing.

The adsorbent material within the adsorbent bed is a key component of the adsorption system. It is desirable to use a material with low thermal and mass diffusion resistances. It is also desirable to use a material that has a high adsorption capacity for the heat transfer fluid. High adsorption capacity is related to the surface area, pore size and relative strength of the adsorption sites. While commonly used adsorbents of water include zeolite 13X and silica gel, these materials have relatively low adsorption capacities of at saturation conditions. For example, they may have adsorption capacities of less than 30% by weight. In the system described herein, it is desirable to have an adsorption capacity that is higher than 30% at low relative pressures. For example, it can be desirable to have an adsorption capacity near 80% by weight at a relative pressure below 0.2 atm. To achieve high adsorption capacities for water, porous materials with high surface areas and small pore diameters, such as less than 2 nm, are needed.

The adsorbent material can include a zeolite, a biporous zeolite, a metal oxide frameworks (MOF), or any other nanostructured material. Biporous zeolites can include MCM-41, which can be synthesized from VPI-5 zeolite nanoparticles to achieve high adsorption capacities approaching and exceeding 80% by weight for water. MCM-41 zeolites are mesoporous sieves that can have surface areas greater than 1000 $m^2/g$ and pore diameter of about 3 nm. MCM-41 is commercially available through suppliers such as Tianjin Chemist Scientific Ltd. and Sigma-Aldrich. MCM-41 can be synthesized using a liquid-crystal 'templating' mechanism in which the silicate material forms inorganic walls between ordered surfactant micelles. VPI-5 is an ALPO-type zeolite with pore diameters of about 1.2 nm and has a higher water adsorption capacity than commonly used zeolite such as 13X. In addition, an adsorbent material made of VPI-5 zeolites can desorb all of its water at temperatures as low as 55° C. at varying desorption rates compared to that of zeolite 13X. Synthesizing MCM-41 from VPI-5 nanoparticles having nominal pore diameters of less than 2 nm can significantly enhance water adsorption capacity. Synthetic procedures for VPI-5 and MCM-41 are well documented.

As noted above, the adsorbent material can include a biporous zeolite. Biporous zeolites can be created using VPI-5 nanoparticles as structural material in the synthesis of MCM-4. The resulting biporous zeolites can have a large surface and a nominal pore diameter of about 1.5-2 nm. Consequently, the biporous zeolites provide an adsorbent material that has improved adsorption and transport properties when compared to common zeolites, such as zeolite 13X.

As noted above, the adsorbent material can include a MOF. MOFs can have strong water binding sites while also maintaining storage space and a hydrophilic micropore environment. These MOFs can be highly porous, crystalline materials that are constructed from metal oxide and rigid organic molecular building blocks. The concept of reticular chemistry (of combining specific organic linkers and inorganic secondary building units) has been used to engineer an exceptionally porous MOF called MOF-210. MOF-210 has the highest BET and Langmuir surface areas (6,240 and 10,400 $m^2/g$, respectively) and the largest pore volume (3.6 $cm^3/g$) among any crystalline porous solid currently known. In addition, highly porous MOFs, such as MOF-5, MOF-177, and MOF-210 exhibit impressive gas ($H_2$, $CH_4$, and $CO_2$) uptake capacities. Accordingly, the adsorbent material in the adsorbent bed can include any MOF, such as MOF-5, MOF-177, MOF-199, Mg-MOF-74, or MOF-210.

The structure of MOFs can be modified at the molecular level by modifying pore diameter, polarizability, and hydrophobicity. These modifications can result in high water adsorption capacity and reversible storage at room temperature. During the adsorption process, water is bound to the adsorbent material through physiosorption. In one example, a MOF can be synthesized using a multi-topic carboxylic acid, which is an organic building block. This organic building block can be dissolved or dispersed in an aqueous or organic solvent with a metal salt and heated. In one example, the heating can last for about 5-72 hours upon which a single or polycrystalline material is obtained from the reaction mixture. Parameters such as temperature, time, reaction vessel, reactant stoichiometries, solvent polarity and pH can be adjusted to influence the reaction. Using these methods, new topologies and optimized crystallization conditions for synthesis of isoreticular materials (based on a given topology) have been discovered. Exemplary materials are described by Yaghi and coworkers in, for example, U.S. Pat. Nos. 7,662,746; 7,652,132; 7,524,444; 7,309,380; 7,196,210; 6,930,193; 6,929,679; 6,893,564; and 5,648,508; each of which is incorporated by reference in its entirety. See also U.S. patent application publication nos. 2010/0186588; 2007/0202038; 2006/0252641; 2006/0185388; and 2005/0192175; each of which is incorporated by reference in its entirety.

Stable and robust frameworks can be synthesized by combining metal ions and organic linkers to provide strong metal-organic bonds. Since a crystalline MOF is generally synthesized through a reversible reaction, the metal-organic bond strength is moderate. For example, zeolitic imidazolate frameworks (ZIFs) that are replete with metal ions linked with aromatic imidazolates. The electronic characteristics of ZIFs can be tuned to enhance its capacity for binding water. Additionally, ZIFs have high thermal and chemical stability that can serve as a possible adsorbent material in the adsorbent bed.

Figure 4:
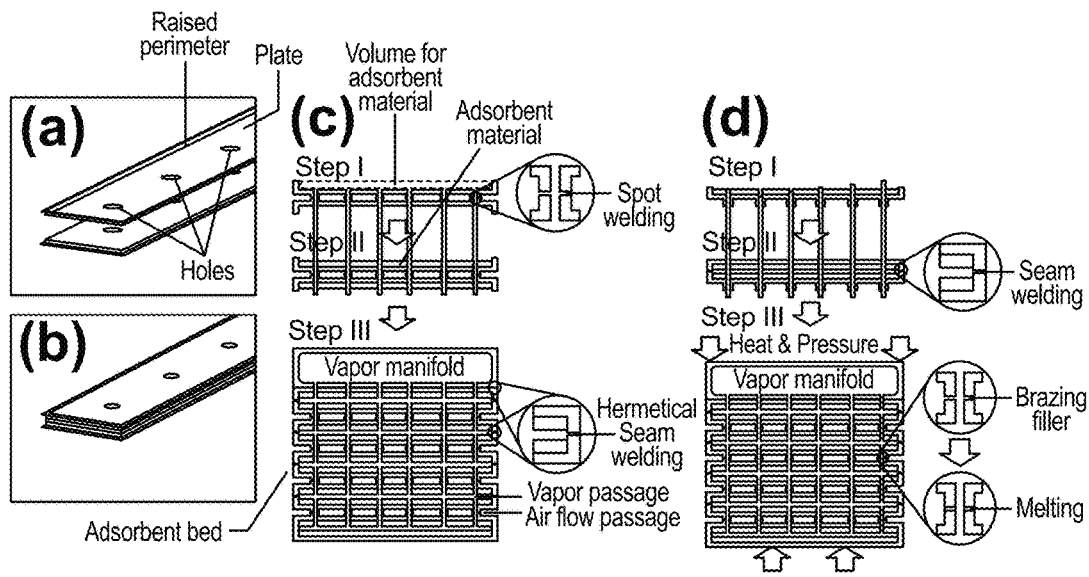
FIGS. 4A-4D are diagrams of two fabrication processes for the adsorbent bed.

The adsorbent beds can have any suitable configuration and can be constructed using any suitable manufacturing process. The adsorbent beds can include a plurality of metal plates. FIG. 4a illustrates one example of a metal plate. FIG. 4b shows the same plate with a layer including an adsorbent material. The plates can be arranged in a stack and seam-welded to provide a hermetic seal. In a first example, two punched and pressed metal plates are brought together and joined by, for example, a spot welded joint where the raised portions meet, as shown in FIG. 4c. Each plate can be formed through a punching and pressing process. During the pressing process, the plate is pressed along a top surface to produce a raised perimeter extending upward. During the punching process, a series of holes along the length of the metal plate are produced by punching, which results in raised portions extending from a bottom surface of the plate as an artifact of the punching process. By flipping a second plate with respect to a first plate, the raised portions of the adjacent plates can be aligned and mated through welding, brazing, or any other suitable process. As a result, the joined raised portions define air flow passages between the adjacent plates. The raised portions also provide mechanical support to the adsorbent bed as a whole. Thin layers including an adsorbent material are deposited on a portion of each metal plate. For instance, the layer can be deposited within a volume defined by a top surface and a raised perimeter of the plate. In one example, the layer can have a thickness in a range of about 0.10-20 mm, of about 0.5-10 mm, of about 1-5 mm, or of about 1.5-2.5 mm.

In a second example, the thin adsorbent layers can first be deposited on each metal plate, as shown in FIG. 4d. The perimeters of adjacent plates can then be joined by, for example, a seam-welded joint. The prepared modules can then be stacked together with brazing fillers located between the raised portions. Finally, the stack of plates can be heated, while maintaining pressure on the stack, to melt the brazing filler and provide a hermetic seal. The stack can include an inlet manifold and an exit manifold. The manifolds allow the stack to be fluidly connected to the system. As a result of the manufacturing process, the contacting boundary between each manifold and the stacks is seam-welded and hermetically sealed. In one example, brazing can be performed at a temperature of about 400-970° C. in an environment of hydrogen and nitrogen (5% and 95%, respectively), or in a vacuum environment, while applying about 60 kN/m² pressure to the stack.

It is desirable for the adsorbent material to have good heat transfer properties. This prevents adsorption and desorption processes from being incomplete and also improves the system's efficiency. However, it has been found that adsorbents (e.g., zeolites or single crystalline MOFs) have low thermal conductivity (~0.3 W/mK). Besides the intrinsic low thermal conductivity of adsorbents, interfaces between crystalline structures can also present large thermal resistance. In order to enhance the thermal conductivity and mechanical strength of adsorbent layers, a binder can be incorporated into the material. The binder can have a higher thermal conductivity than the adsorbent material. One suitable binder material is carbon. For example, graphite flakes or carbon nanotubes (CNTs) that have high thermal conductivity can be incorporated into the adsorbent layers. These carbon components can conduct heat from the adsorbents to the final heat transfer surfaces, such as the outer surfaces of the adsorbent beds. See, for example, Zheng, Gao, and Chen, WO 2011/084481, "Electrically and/or Thermally Conductive Suspensions Including Graphite Microfluids," which is incorporated by reference in its entirety. See also Zheng, Gao, and Chen, U.S. patent application publication nos. 2011/0220841 and 2011/0140033, each of which is incorporated by reference in its entirety.

Carbon can be incorporated into the thin adsorbent layers through any suitable method. In one example, carbon-based binders are mixed with adsorbent powders. In particular, graphite flakes or CNT binders can be mixed with adsorbent powders and mechanically stirred. After stirring, the mixture can be deposited on the metal plates of the stack. Finally, the mixture can be thermally treated at a high temperature to solidify the adsorbents. The addition of carbon-based binders can result in about a 50% increase in effective thermal conductivity by adding up to 10% graphite by volume into Zeolite 4A using this approach, and pore volume changes less than 10%.

In another example, adsorbent materials can be directly synthesized on a graphite flake network fabricated through a phase change process. During a process, the graphite flakes can be dispersed into a liquid. Through a liquid-to-solid phase change, a network with percolated graphite flakes can be established. By evaporating the base material, a clean graphite flake network is obtained which the zeolite/MOF structures can be directly synthesized in or infiltrated into.

Graphite-based additives can improve thermal conductivities in both liquid and solid phases. In one example, exfoliated graphite can be obtained by microwave expansion and, by adding as little as 1% graphite by volume, thermal conductivity can be enhanced by about 150-250%. This increased thermal conductivity can result from percolation of graphite flakes. During the liquid-to-solid phase transition, graphite flakes can be pushed to grain boundaries and the stresses generated can further reduce the contact resistance between graphite flakes, leading to even higher thermal conductivity enhancement. Thermal conductivity of the percolated graphite structures can be improved by varying the thickness and size of the graphite flakes.

In addition to thermal conductivity, mass diffusivity is also greatly improved by adding nanoparticles into fluids. For example, mass diffusivity may increase by about 600%. An increase in mass diffusivity allows the adsorption and desorption processes to be sped up. By allowing for more rapid desorption, the charging time required to desorb the fluid and refill the reservoir can be reduced.

Organic binders can be added to the adsorbent material. For example, organic pore-forming binders such as melamine and hydroxyethyl-cellulose can be added to improve the material's mass transfer. These organic binders can be used to enhance the binding strength in the early stage of a formation process and can also be used to increase the porosity of the final product by burning them off during a thermal process.

In one example, the total pressure drop across the system can be estimated by assuming the entire flow path is saturated at a particular temperature; for example, about 3° C. in the case where water is the heat transfer fluid. It can be assumed that the water vapor transfer in adsorbent structures is mainly influenced by the intercrystalline macropores, where the diameter of pores is about 1 µm. The pressure drop across the adsorbent layers is estimated using a Knudsen diffusion equation since the mean free path of water vapor molecules (>10 µm) is much larger than the pore size at low pressures. Darcy's law is applied to determine the pressure drop, where permeability is about $5 \times 10^{-12}$ m². The mass/volume flux through the adsorbent layer is assumed to linearly decrease with diffusion distance due to ongoing adsorption events. The vapor pressure drop in other vapor header lines is estimated using Darcy-Weisbach equation.

In another example, in order to provide a 2.5 kW cooling rate, 4.2 kW of heat needs to be dissipated from the bed when the COP is about 0.6. The conduction resistance across the adsorbent layer can be estimated by assuming that the effective thermal conductivity of the adsorbent/binder layer is about 0.35 W/mK. The convective resistance between the cooling air flow and the stack plates can be estimated from a Dittus-Boelter equation, and the temperature rise of the cooling air flow is set to be about 2° C.

While the foregoing disclosure describes a thermal system capable of providing climate control for a vehicle cabin, the system is not limited to this use. For instance, the thermal system can be used to provide climate control within any space, such as a home or building. Moreover, it can also be used for any other application that requires portable or fixed heating or cooling, indoors or outdoors.

EXAMPLES

Transient Analysis of the Adsorption Bed

Figure 5:
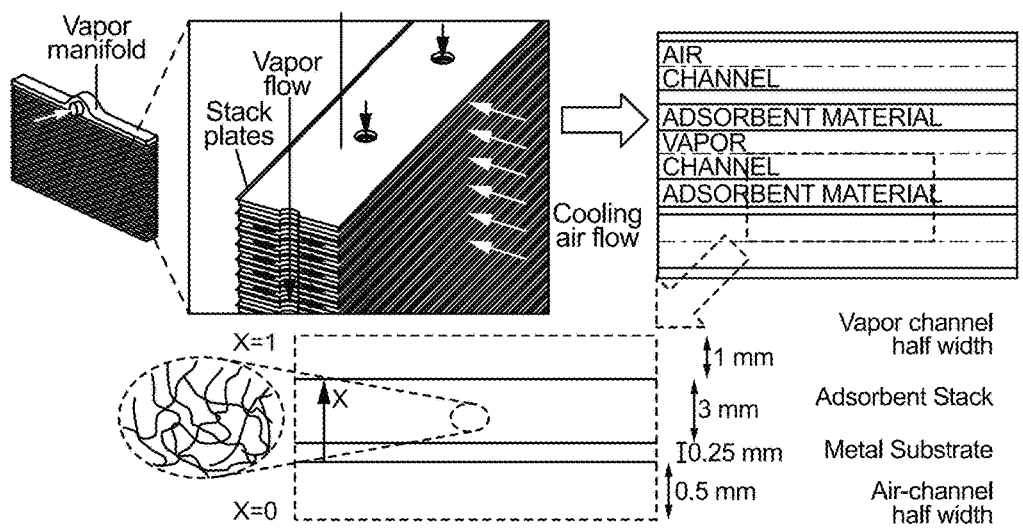
FIG. 5 is a schematic illustration describing a unit cell for one dimensional transient analysis of heat and mass transfer.

A one-dimensional, transient analysis of heat and mass transfer occurring within the adsorption bed was carried out to determine the performance as a function of time for typical operating conditions and geometric parameters of the ATB (FIG. 5). The analysis utilized the thermophysical properties of conventional, commercially available zeolite 13X as the adsorbent. Furthermore, the analysis assumed fixed boundary conditions, i.e., the vapor pressure in contact with the adsorption bed was maintained at 500 Pa. The adsorbent was assumed to be at 295 K initially and the air side temperature was also fixed at 295 K. This analysis can also be implemented for other adsorbents and different geometric and operating conditions.

Figure 6A:
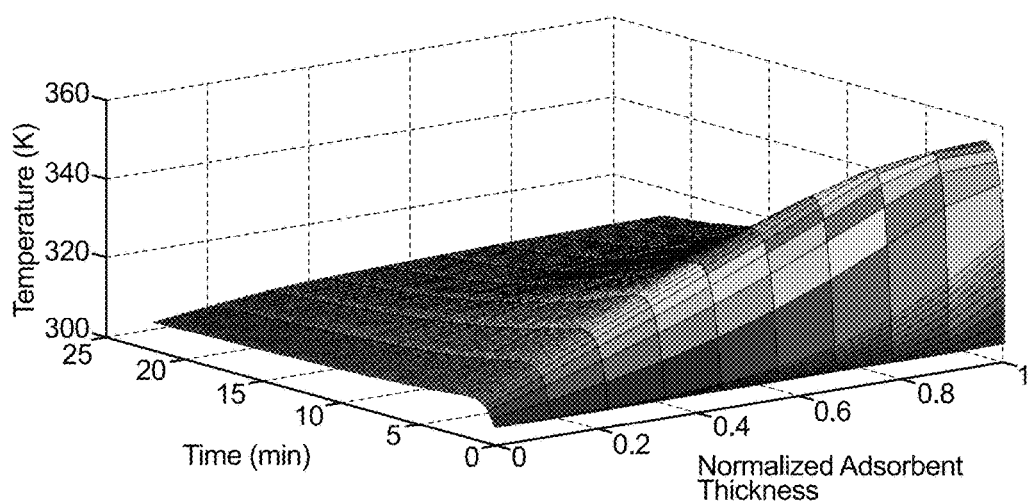
FIG. 6A shows temporal and spatial profiles of temperature for a one dimensional transient analysis of heat and mass transfer.
Figure 6B:
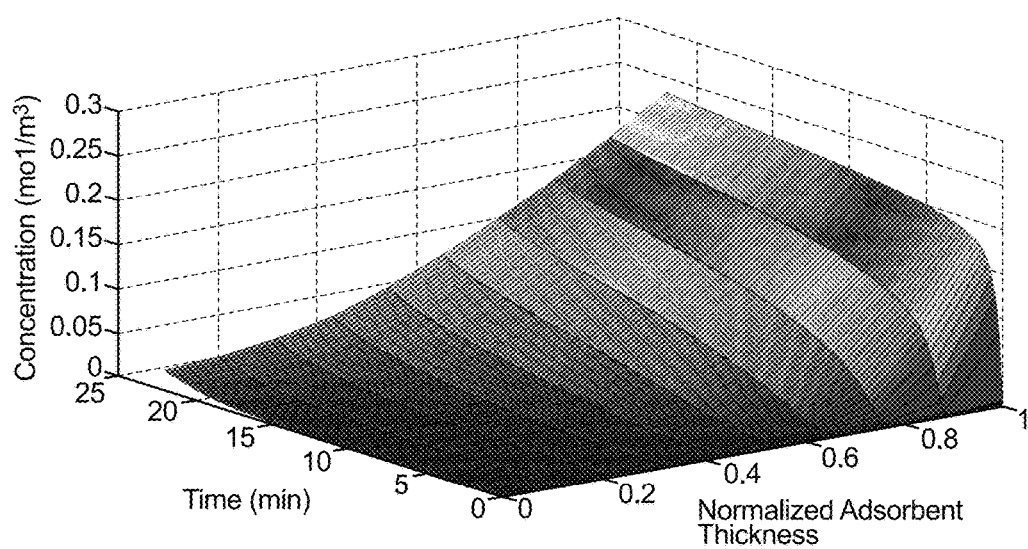
FIG. 6B shows temporal and spatial profiles of vapor concentration.
Figure 7A:
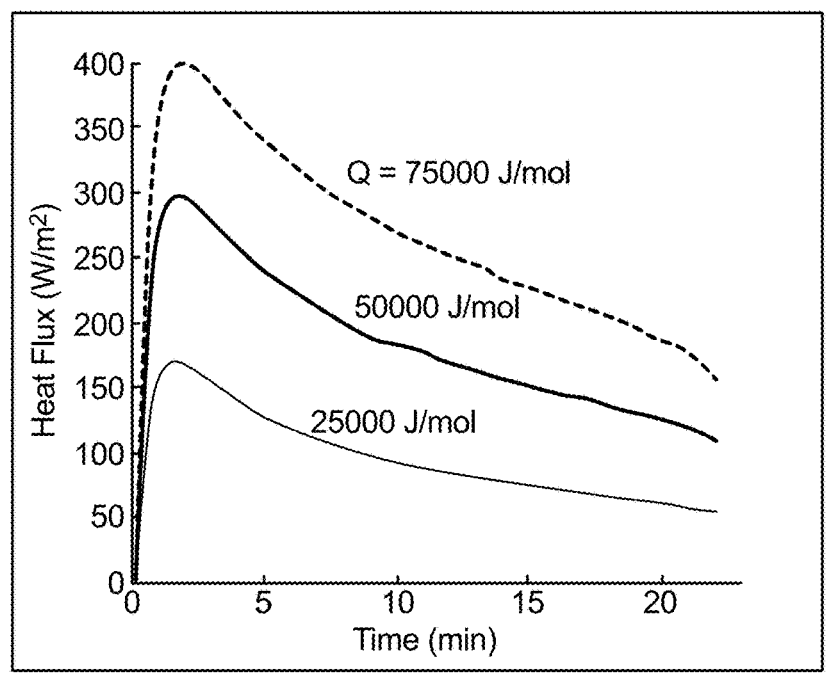
FIGS. 7A-7B show results from a one dimensional transient analysis of heat and mass transfer.
Figure 7B:
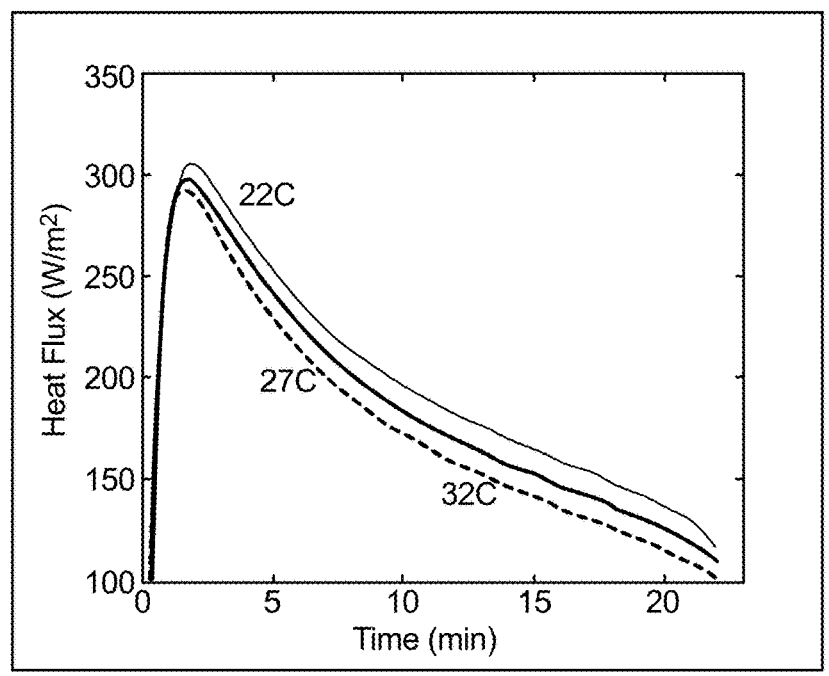

For the chosen geometric and operational parameters, the variation in temperature and concentration within the bed indicated that the adsorption process can dramatically change with time, which is evident from FIG. 6. The spatial coordinates shown in FIGS. 6A-6B were normalized with respect to the total thickness of the bed. Consequently, the boundaries x=0 and 1 represented the air and vapor side, respectively, which is also highlighted in FIG. 5. FIG. 6A shows an initial rise in the temperature profile of the bed within the first few minutes of bed operation. This represented the effect of heat generation within the bed due to vapor adsorption. The rate of heat generation controlling the temperature distribution depended on the variation of vapor concentration across the bed (FIG. 6B). The maximum temperature within the bed was expected at the boundary facing the vapor channel (x=1), since this boundary was effectively insulated (due to face symmetry with adjacent unit cell). On the other hand, the minimum temperature was expected on the side exposed to forced convection due to cabin air flow (x=0). The variation of heat flux dissipated to the cabin air from the bed as a function of time is shown in FIGS. 7A-7B. The results showed the effect of the heat of adsorption and average air temperature, respectively. Clearly, the amount of heat transferred from the bed to the cabin air over time depended on the temperature variation within the bed, which directly affected the system performance.

In some situations, active control of vapor flow may be desirable, considering the transient nature of heat dissipation shown in the results. In effect, flow modulation can promote efficient utilization of the adsorption bed to maximize the vehicle driving range with an active climate control to meet the cooling and heating loads within the cabin.

A study of the designs described above in FIGS. 8A-8B was carried out to determine the geometric configurations yielding optimal performance while limiting the volume and weight of the adsorption bed.

Figure 9A:
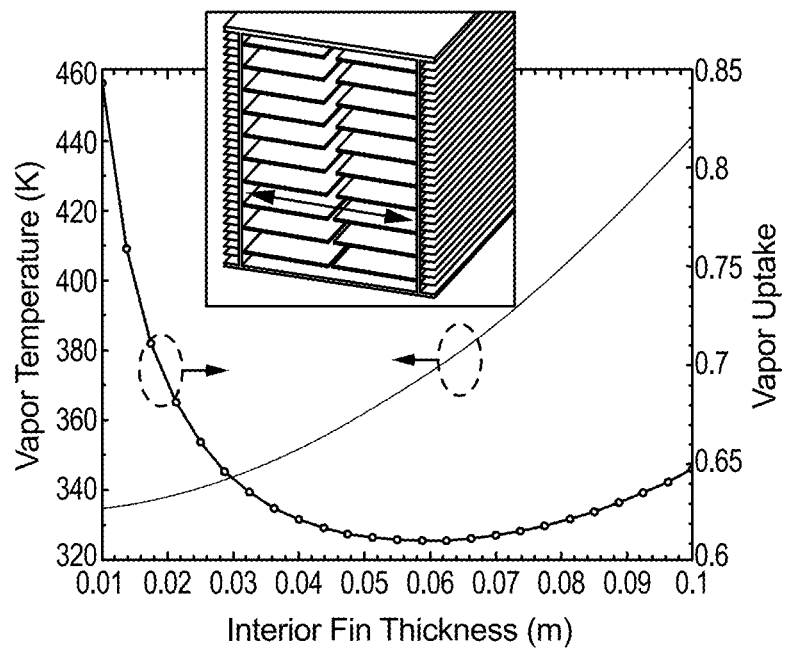
FIG. 9A shows, for the design of FIG. 8A, the vapor temperature (K) and required vapor uptake (wt. %) to dissipate 4.5 kW as a function of the length of internal fins (m).

To optimize the performance of the adsorption bed, the characteristic dimensions of both designs have to be carefully chosen. For example in the first design of FIG. 8A, the effect of the length of internal fins supporting the adsorbent was investigated, and the results are shown in FIG. 9A. For a bed with a fixed total volume of 9 liters, heat dissipation of 4.5 kW and net weight under 8 kgs, as the length of the internal fin is increased, a larger mass of adsorbent could be packed within the bed. The net vapor uptake required from a unit mass of adsorbent can thus be reduced to 65% and the operational temperature of the bed can be maintained close to 90° C. if the internal fins are ~5 cm in length.

Figure 9B:
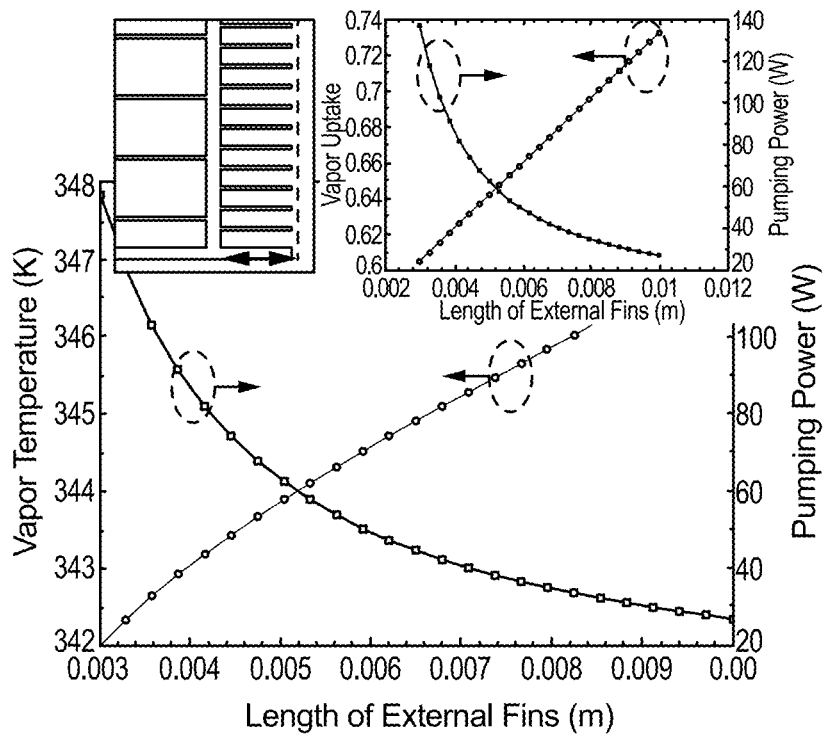
FIG. 9B shows, for the design of FIG. 8A, vapor temperature (K) and pumping power (W) for air circulation as a function of the length of the external fins (m).

On the other hand, FIG. 9B shows the effect of the length of the external fins on the characteristic bed temperature and pumping power required to implement forced convection using confined air. The thermal resistance corresponding to the air side heat transfer was minimized by designing mini-channels, while maintaining the net pumping power within practical limits (~100 W). The inset in FIG. 9B also illustrates the increase in the net vapor uptake required to dissipate 4.5 kW as the external fins become longer.

Figure 10A:
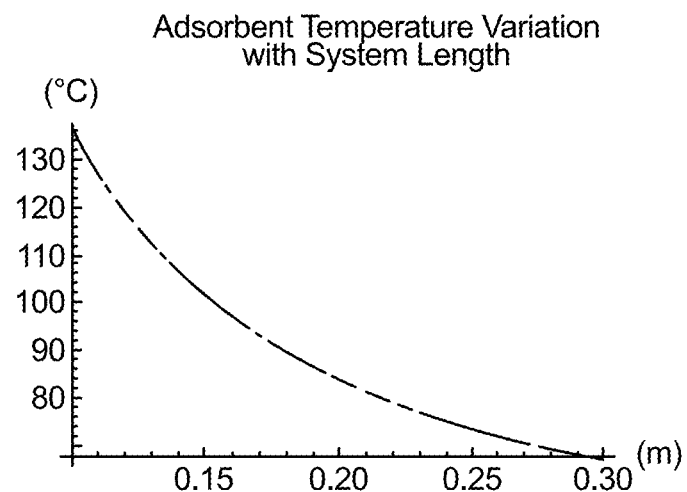
FIG. 10A shows, for the design of FIG. 8B, the variation of average bed temperature (° C.) as a function of the overall length of the bed (m).
Figure 10B:
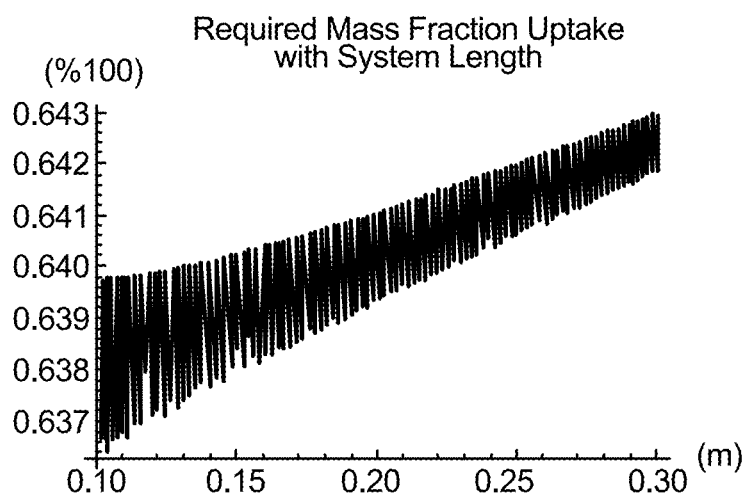
FIG. 10B shows, for the design of FIG. 8B, the required vapor uptake (wt. %), as a function of the overall length of the bed (m).

In the case of the liquid-cooled adsorption bed illustrated in FIG. 8B, while limiting the total bed volume and desired power output, an advantageous geometry had six individual cooling tubes with 0.3 mm adsorbent-mounting fins, each supporting two 1 mm thick adsorbent layers, separated by a 1 mm gap for vapor transport. The finned-tubes were 1.3 cm in diameter and supported an average coolant velocity of 0.25 m/s, using 10 W for coolant circulation. See FIG. 10A. FIG. 10B shows the required adsorbent mass percent vapor uptake and mean adsorption bed temperature as a function of the length of the bed. The mass of the system in this configuration scaled from 11.35 kg at the 10 cm system length to 11.1 kg at the 25 cm system length, not including the additional mass of the coolant, piping, secondary heat exchanger and pump. With these additional components, the predicted system mass rose to 14.1 kg and the 2-bed volume to 21 liters.

Two-Dimensional Analysis of the Adsorption Bed

Figure 11:
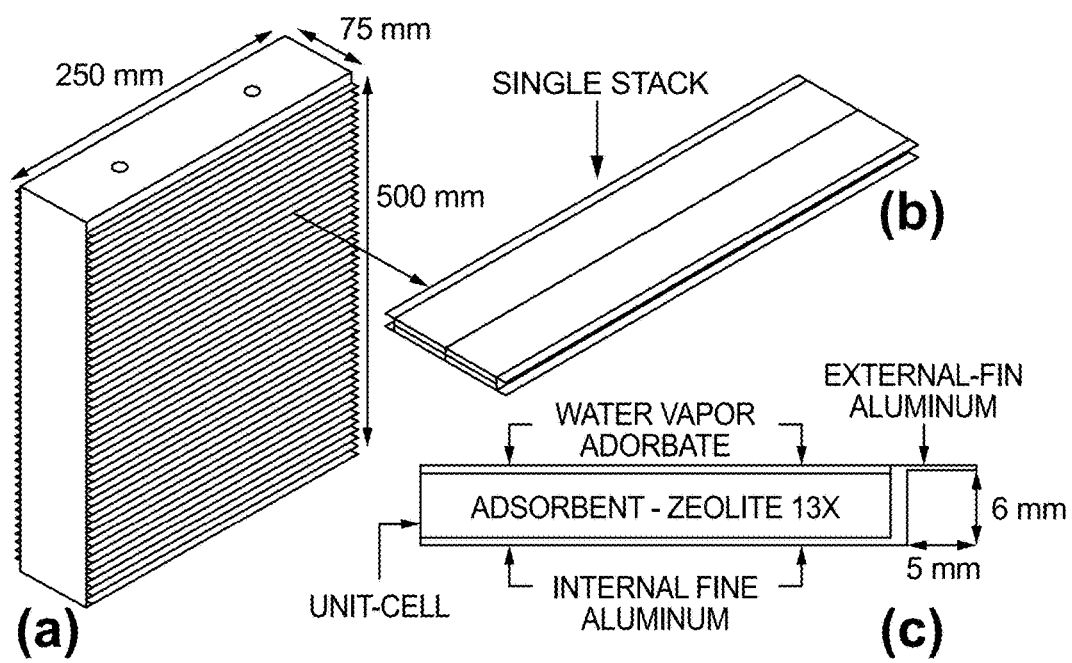
FIGS. 11A-11C are schematic diagrams of an adsorption bed.

A two-dimensional, transient analysis of the design in FIG. 11 was carried out to predict the rate of heat and mass transfer taking place during the adsorption of water vapor in a bed using zeolite 13X. While the analysis can be carried out for any adsorbent, zeolite 13X was considered since its adsorption characteristics and thermophysical properties were readily available in literature. Furthermore, zeolite 13X showed higher vapor adsorption capacity in comparison to other commercially available and inexpensive zeolites. This computational simulation of adsorption can determine the effect of various operational parameters, such as vapor pressure, ambient air temperature, bed geometry and thermophysical properties such as heat capacity, density, and thermal conductivity. FIG. 11 shows an overall design of the advanced thermal battery (ATB). The isometric views in FIGS. 11A-11B show the overall bed geometry and the shape of a single stack, respectively. Since the an adsorption stack is symmetrically shaped, it can be constructed from a unit cell, which represents one quarter of the entire stack. The geometry of the unit cell, which is utilized as a framework to predict the overall performance of the ATB is shown in FIG. 11C.

The unit cell included the adsorbent layer (zeolite 13X), adsorbate (water vapor) and metallic fins (internal and external) as indicated in FIG. 11C. The internal fins held the adsorbent, and provided an efficient conduction path to transfer heat generated during adsorption to the external fins, which dissipate the heat to airflow through forced convection. The geometric parameters were the width and the thicknesses of the adsorbent layer and the metallic fins.

Figure 12:
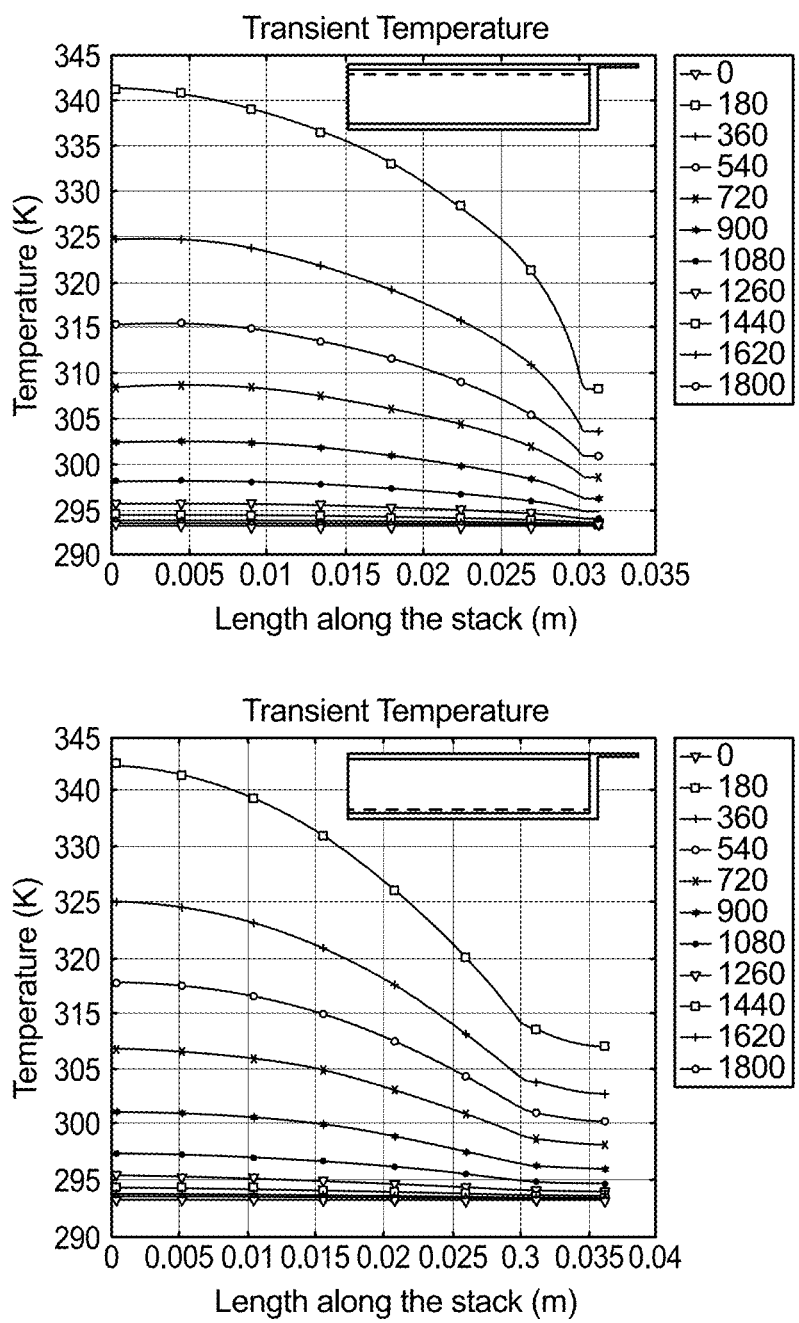
FIG. 12 shows temperature distribution as a function of time along two cross-sections located at the boundaries of the bed denoted by the dotted lines in the inset. The upper panel shows the temperature variation at the adsorbent-vapor interface; the lower panel shows the temperature variation at the adsorbent-metallic fin interface.

In order to predict the performance of the bed, a uniform temperature and a fully evacuated adsorbent layer was assumed as an initial condition. Furthermore, during the operation of the bed, the boundaries of the adsorbent that are exposed to vapor were assumed to be maintained at a constant vapor concentration. These boundaries were also assumed to be insulated by virtue of symmetry of the unit cell. The external fins represented boundaries for heat transfer via forced convection. For these operating conditions, the temperature, vapor concentration and vapor uptake (adsorption) at any location within the bed can be obtained as a function of time during the bed operation. For illustration, FIG. 12 shows the variation in temperature along the two different cross-sections along the length of the adsorption layer (as indicated by the dotted lines in the insets for FIG. 12.

Starting from an initially dry condition and a uniform temperature of 293.15 K (20° C.), the temperature of the bed rose to 70° C. within first 3 minutes of bed operation due to the heat generated during adsorption. Subsequently, the bed temperature decreased as the generated heat was effectively dissipated to air. Since the adsorption capacity of various adsorbents were found to decrease at higher temperatures, the bed should be maintained at a relatively low temperature to maximize vapor uptake.

Figure 13:
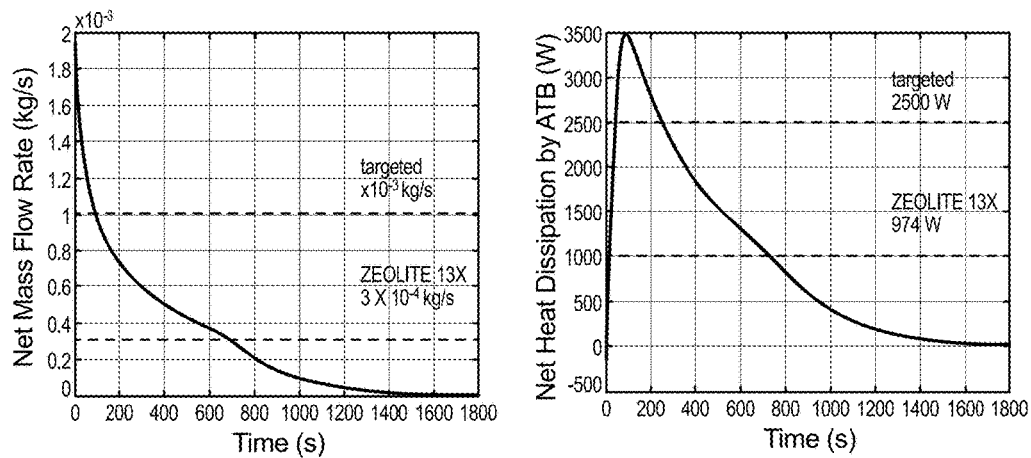
FIG. 13 shows (left panel) the net rate of vapor adsorption, and (right panel) the net rate of heat dissipation at the bed for the first 30 minutes of bed operation.

FIG. 13 shows the variation of net rate of vapor adsorption and the overall heat generated within the bed (FIG. 11). For a constant vapor pressure within an initially dry bed, both vapor adsorption and heat generation peaked during early stages of bed operation. They then depreciated quite steeply, as the bed became saturated with vapor. The average values of both vapor adsorption and heat generation using commercial zeolite 13X were less than targeted metrics. An average vapor adsorption rate of $3\times10^4$ kg/s was sustained; a three-fold increase would meet a target of 2500 W cooling. On the other hand, an average heating load of only 974 W was sustained. Since the heat of adsorption is marginally higher than the latent heat of evaporation, a ~2.5× increase would meet a target of 2500 W for EV heating.

Measuring the Intra-Crystalline Diffusivity of Zeolite 13X

The intra-crystalline diffusivity D in zeolite 13X can be a limiting factor for mass transport inside the adsorption bed. Knowledge of D can be important to accurately model vapor uptake in the adsorption bed. An approximate value for D can be obtained by measuring the transient vapor uptake response of zeolite 13X in the TGA vapor sorption analyzer, and calculating it as a fitting parameter for the vapor uptake as a function of time using the analytical model for intra-crystalline diffusion based on Fick's law.

Analytical Model for Vapor Adsorption

Each zeolite particle was modeled as an array of uniform spherical crystals. Vapor diffusion between the zeolite crystals was assumed to be instantaneous relative to the diffusion within the crystals. Additionally, the humidity in the TGA chamber was assumed to be a step input from 0 to a target value. The governing equation for vapor diffusion within the crystals is given by $$\frac{\partial C}{\partial t} = D\left(\left(\frac{\partial^2 C}{\partial r^2} + \frac{2}{a}\frac{\partial C}{\partial r}\right)\right)$$

where C is vapor concentration at time t, a is the particle radius (2 μm), and r is radial coordinate.

For a step change in the humidity, the vapor concentration as a function of time can be calculated using $$\frac{M_t}{M_\infty} = 1 - \left(\frac{6}{\pi^2}\right)\sum_{n=1}^{\infty}\left[\left(\frac{1}{n^2}\right)e^{\left(\frac{-Dn^2\pi^2 t}{a^2}\right)}\right]$$

where $M_t$ is the mass uptake at time t and $M_\infty$ is the maximum vapor uptake.

Comparison of the Analytical Model and Experimental Results

Figure 14:
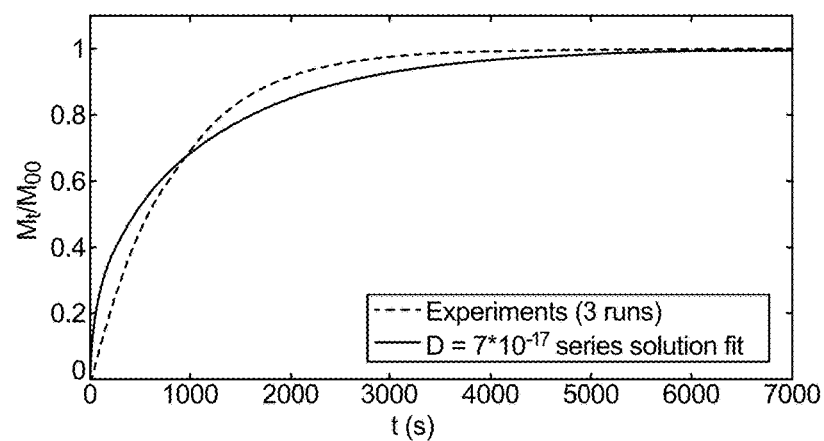
FIG. 14 shows a comparison of analytical model and experiments to determine the rate of vapor adsorption within zeolite 13X crystals.
Figure 15:
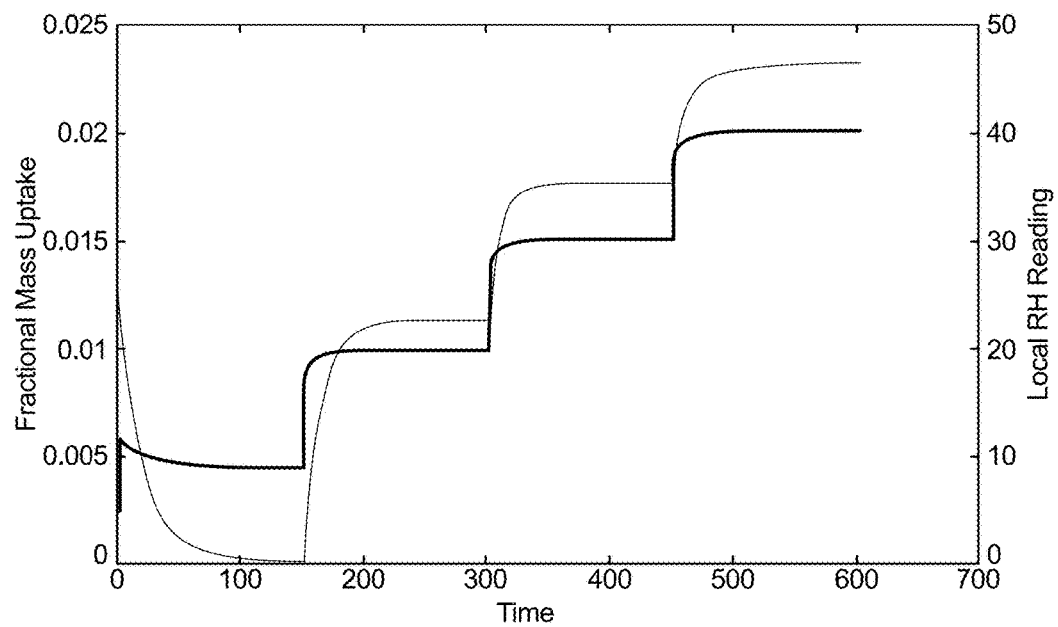
FIG. 15 shows variation in the fractional mass uptake and relative humidity within the TGA chamber.

For three different humidity inputs, an exponentially saturating uptake profile was obtained, as shown in FIG. 14. The parameter D was found to be $7\times10^{-17}$ m²/s. A steeper initial slope of the model fit was most likely due to the delay in relative humidity forcing in the TGA chamber; while the model assumed that the relative humidity was a step input, in reality there was some latency in the chamber humidity spike, as shown in FIG. 15.

Infrared Adsorption Visualization

Figure 16:
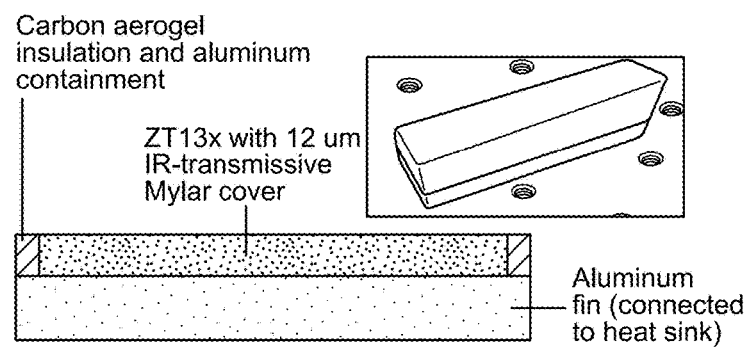
FIG. 16 shows a cross section of zeolite 13X loaded onto a custom-built sample tray to mimic the geometry of a zeolite layer in the a complete adsorption bed.
Figure 17:
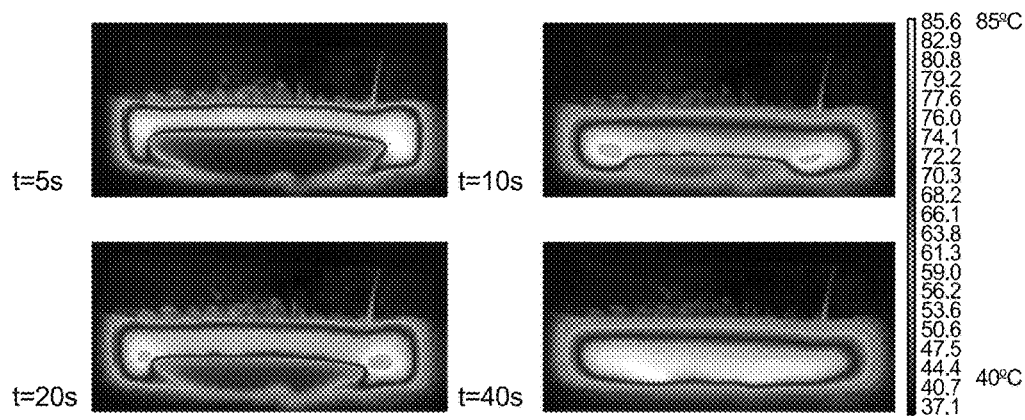
FIG. 17 shows the temperature profile across the cross-section of the zeolite layer captured using an IR camera at different time points.
Figure 18A:
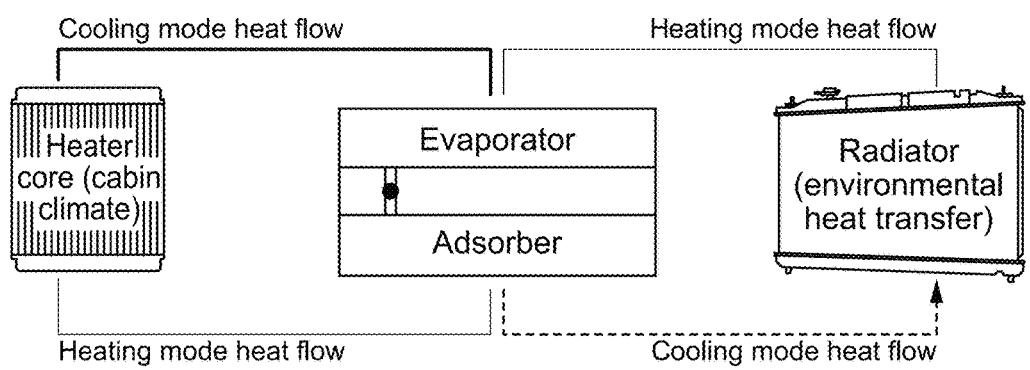
FIGS. 18A and 18C show heat flow and coolant/antifreeze routing, respectively, for the ATB cabin cooling mode.
Figure 18B:
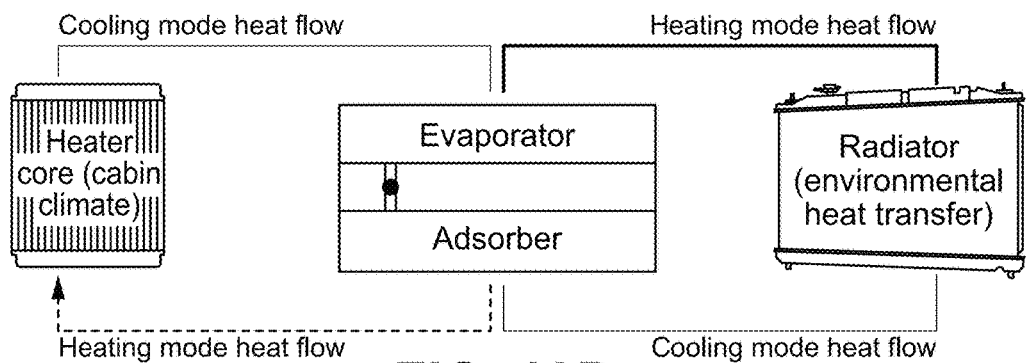
FIGS. 18B and 18D show heat flow and coolant/antifreeze routing, respectively, for the ATB cabin heating mode.
Figure 18C:
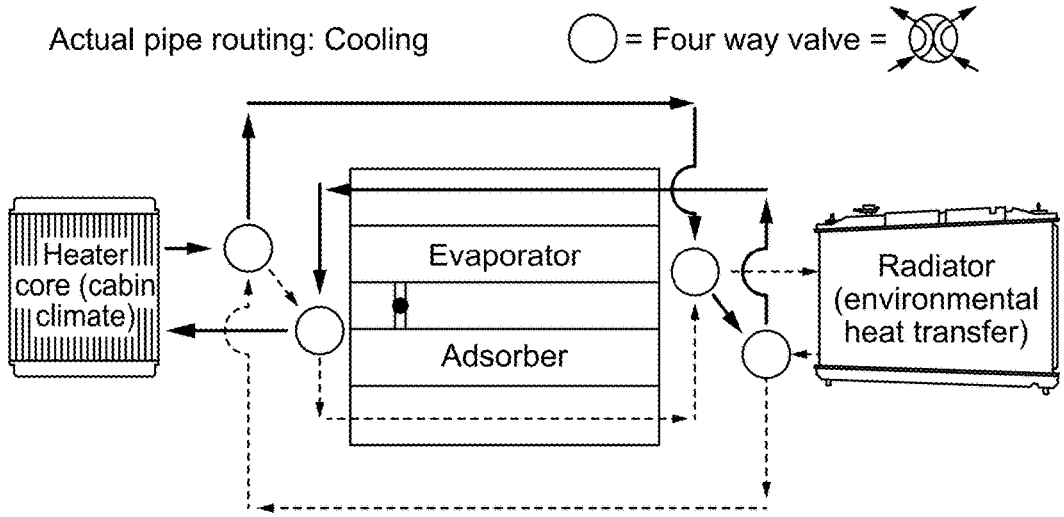
Figure 18D:
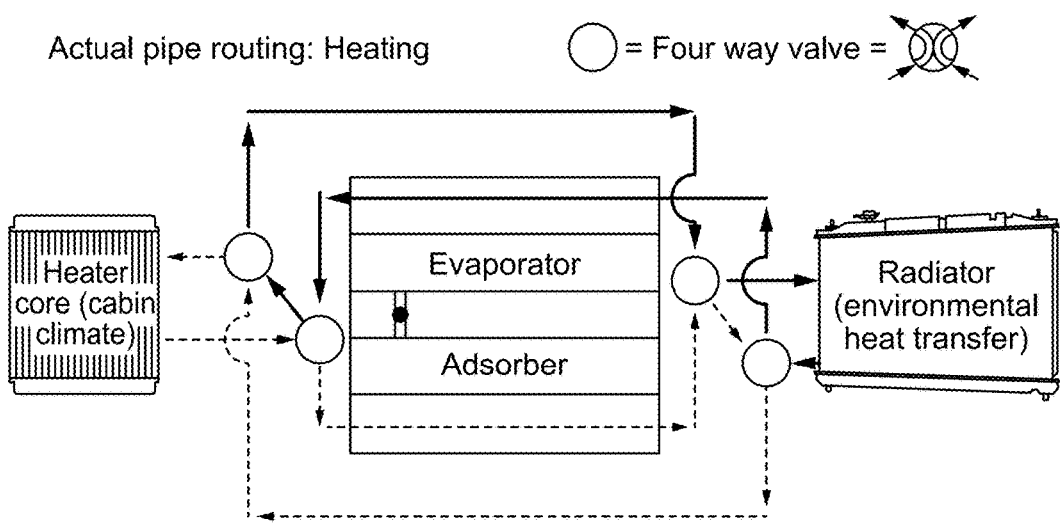
Figure 19:
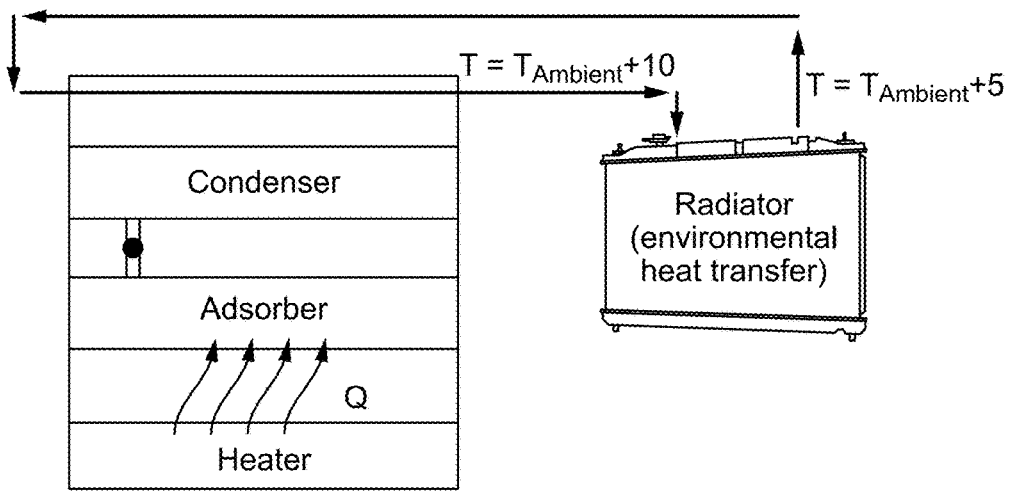
FIG. 19 is a schematic diagram of coolant routing for a monolithically integrated ATB heat pump during system recharge.

A quantitative measurement of transient adsorption processes was used to validate analytical models of adsorption heat and mass transfer, and can help in design of the adsorption bed. An infrared camera was used to measure the heat released during adsorption. A cross section of zeolite 13X was loaded onto a custom-built sample tray, as shown in FIG. 16, to mimic the actual geometry of a single zeolite layer in the planned adsorption bed. The tray was then placed in a vacuum chamber, which was evacuated to 100 Pa. Then it was exposed to a water vapor pressure of 1000 Pa, similar to the expected condition in the ATB system. The heat released in the zeolite upon adsorption was then measured using an infrared camera through a sapphire viewport in the vacuum chamber. The measured temperatures were verified using a j-type thermocouple placed inside the zeolite. The resulting temperature profiles are shown in FIG. 17.

Valve System for Liquid Cooled Integration into Automotive Systems

Using a liquid coolant, rather than air, can ease fabrication and minimize thermal contact between the adsorbent and evaporator during system discharge. Although the addition of an intermediate heat exchanger adds an additional thermal resistance between the ATB heat pump and the vehicle cabin environment, the liquid cooling scheme has other advantages beyond a low thermal leak rate. These advantages include 1) using heat exchange structures already present in the vehicle (i.e., heater core and radiator), thereby increasing the volume available for adsorbent in the ATB and streamlining vehicle integration; 2) eliminating the bulky and inefficient ductwork between the ATB and cabin; and 3), allowing more flexibility in the shape of the ATB bed, as airflow considerations can be disregarded. The heating and cooling antifreeze routings are shown in FIGS. 18A-18D and 19.

Mass Uptake Calculations

Figure 20:
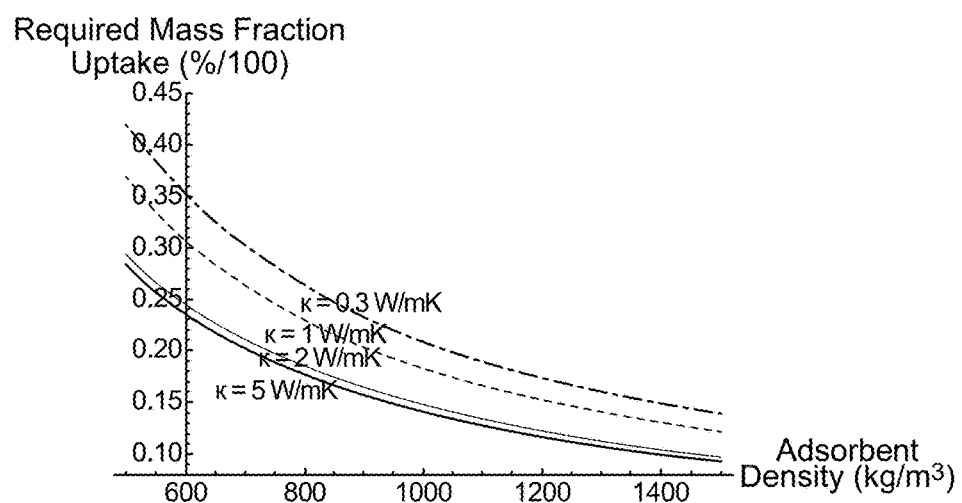
FIG. 20 shows estimated adsorbent mass percent uptake requirement as a function of adsorbent density and thermal conductivity, with four 0.6 cm adsorbent coolant tubes mounted with 0.7 mm fins, and with an adsorption site temperature of 80° C.

Consolidating the evaporator and condenser to a single structure and eliminating bulky ducting and local air heat exchangers allows more volume for adsorbent material. As a result, the required mass percent uptake varies with the adsorbent density and acceptable adsorbent site temperature as shown in FIG. 20.

Heat Transfer Calculations

Figure 21:
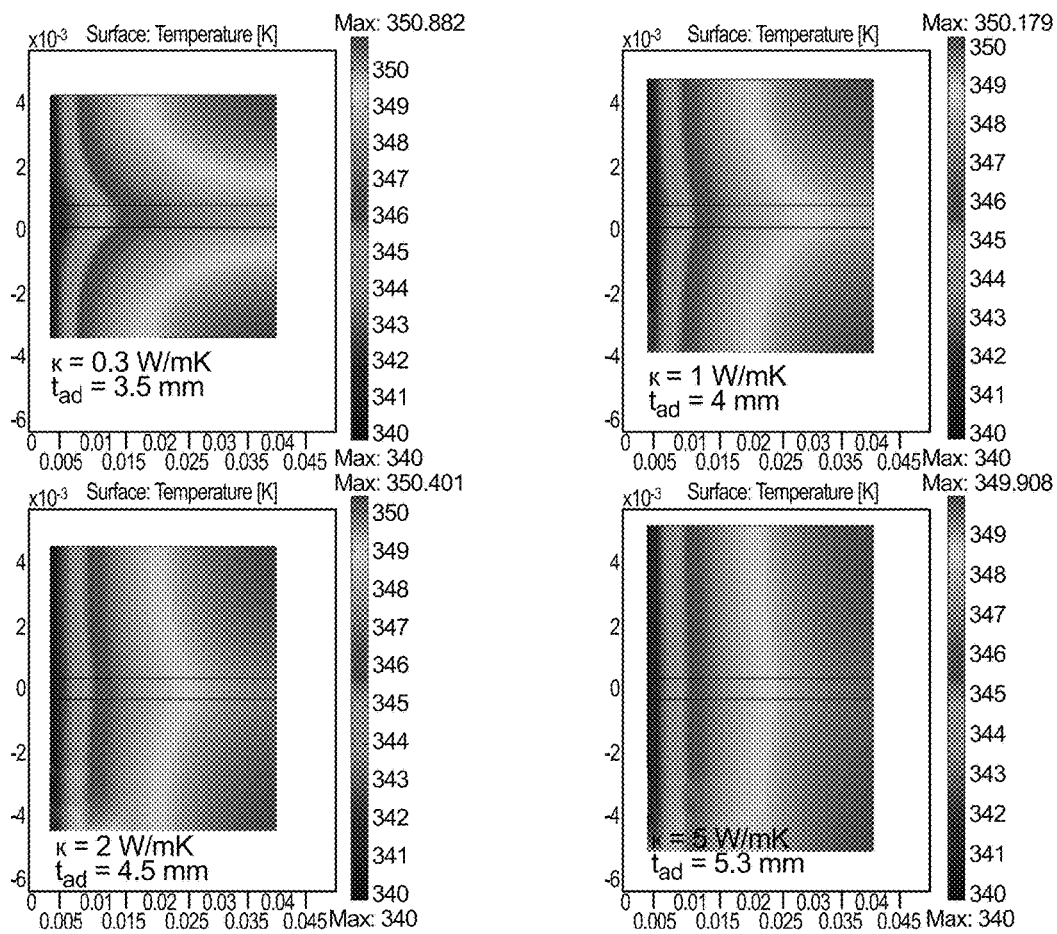
FIG. 21 shows predicted adsorption site temperature on an adsorbent-bearing fin tube for 4 radially symmetric fins. The maximum temperature was held to 80° C., the coolant flow is at the system average of 70° C. through 0.6 cm pipes, and the fin thickness was 0.7 mm. The figure shows simulations for four different adsorbent thermal conductivities, and gives the resulting adsorbent layer thickness $t_{ad}$ that was required to keep the maximum temperature below 80° C. The vertical axis denotes millimeters, while the horizontal axis denotes meters.

The thermal analysis of the monolithically-integrated bed design bears some similarity to the analysis of a liquid-cooled multi-vessel system. Adsorbent temperature can be estimated based on assumed radiator and heater core heat exchanger efficiencies. Assuming $\eta_{radiator}=\eta_{heater-core}=0.9$ and four 1 cm diameter adsorbent coolant pipes, the average coolant temperature in the adsorbent cooling tubes could be kept at approximately 70° C. with an adsorbent temperature profile on each fin as shown in FIG. 21. This configuration would require an estimated 40 W of pumping power. FIG. 21 shows the expected adsorption-site temperature based on these assumptions for four fins mounted with adsorbents of various thermal conductivities. For this simulation, volumetric heat generation was assumed to be a constant 126 kW/m³, corresponding to an overall heat delivery of 2500 W. Because the heat of adsorption was higher than the heat of evaporation, the adsorbent temperature would likely be higher than shown in FIG. 21 during 2500 W cooling operation.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:
1. An adsorbent bed comprising:
 a housing including an inlet manifold, an exit manifold and a plurality of pairs of plates;
 wherein each pair of plates of said plurality of pairs of plates define a flow channel within each respective pair of plates;

said flow channels are in fluid communication with the inlet manifold and the exit manifold, wherein the pairs of plates are arranged in a stack;

wherein each pair of plates of said plurality of pairs of plates includes an upper layer including adsorbent material and a lower layer including adsorbent material and the vapor channel of each respective pair of plates being between the upper layer and the lower layer;

at least one airflow passage being provided between two immediately adjacent pairs of plates of said plurality of pairs of plates, said at least one airflow passage being configured to allow air to flow through the at least one airflow passage;

wherein each pair of plates of said plurality of pairs of plates are sealed, thereby preventing the air to flow into the respective flow channel of each pair of plates of said plurality of pairs of plates;

wherein the plurality of pairs of plates include a top most pair of plates, a bottom most pair of plates and at least one intermediate pair of plates;

wherein the vapor channel of the at least one intermediate pair of plates is fluidly connected to the vapor channels of the pairs of plates immediately above and below said at least one intermediate pair of plates via at least one raised portion.

2. The adsorbent bed of claim 1, wherein the adsorbent material comprises a zeolite, biporous zeolite, or metal oxide framework.

3. The adsorbent bed of claim 2, wherein the adsorbent material comprises 13X, MCM-41, MFI, VPI-5, MOF-199, Mg-MOF-74, ZIF, MOF-5, MOF-177, or MOF-210.

4. The adsorbent bed of claim 1, wherein the adsorbent material comprises graphite flakes or carbon nanotubes.

5. The adsorbent bed of claim 1, wherein the upper layer including adsorbent material has a thickness in the range of about 0.1-20 mm.

6. The adsorbent bed of claim 5, wherein the upper layer including adsorbent material has a thickness in the range of about 1-5 mm.

7. The adsorbent bed of claim 1, wherein a first plate of each of the plurality of pairs of plates comprises a raised perimeter extending in a first direction perpendicular to a top surface of the first plate.

8. The adsorbent bed of claim 7, wherein the first plate of each of said at least one intermediate pair of plates comprises a plurality of holes arranged along the top surface and a raised portion of said at least one raised portion surrounding each hole and extending from the first plate in a second direction opposite to the first direction.

9. The adsorbent bed of claim 8, wherein the raised perimeter and the top surface of the first plate defines a volume for receiving the upper layer including adsorbent material.

10. The adsorbent bed of claim 9, wherein a second plate of each of said plurality of pairs of plates comprises a plurality of holes arranged along a top surface of the second plate and a raised portion of said at least one raised portion surrounding each hole in the second plate, wherein the raised portions of the second plates extend from the second plate in the first direction, wherein raised portions of the first plate are joined to respective raised portions of a second plate of immediately adjacent pairs of plates.

11. The adsorbent bed of claim 1, wherein fins are located within each pair of the plurality of plates.

12. The adsorbent bed of claim 11, wherein a housing provides thermal communication between the internal fins and a plurality of external fins.

* * * * *